United States Patent [19]

Funatsu et al.

[11] Patent Number: 5,265,097
[45] Date of Patent: Nov. 23, 1993

[54] DATA PROCESSOR

[75] Inventors: Kenzo Funatsu, Musashimurayama; Takashi Ito, Kokubunji; Naoki Yashiki, Kodaira; Chiaki Kubomura, Tokyo; Keiji Kuboyama, Kodaira, all of Japan

[73] Assignee: Hitachi, Ltd., Tokyo, Japan

[21] Appl. No.: 872,284

[22] Filed: Apr. 22, 1992

Related U.S. Application Data

[63] Continuation of Ser. No. 704,699, May 17, 1991, Pat. No. 5,144,626, which is a continuation of Ser. No. 311,077, Feb. 14, 1989, abandoned.

[30] Foreign Application Priority Data

Feb. 19, 1988 [JP] Japan .................. 63-37169

[51] Int. Cl.$^5$ ............................. H04L 27/26
[52] U.S. Cl. .................. 370/110.3; 379/283; 340/825.48
[58] Field of Search ............. 370/110.3; 379/237, 379/283, 284, 286, 287; 340/825.48

[56] References Cited

U.S. PATENT DOCUMENTS

4,016,370 4/1977 Laoteppitaks et al. ............. 379/283

Primary Examiner—Wellington Chin
Attorney, Agent, or Firm—Fay, Sharpe, Beall, Fagan, Minnich & McKee

[57] ABSTRACT

A data processor comprises a multifrequency receiver formed together with a central processor on a semiconductor substrate. The multifrequency receiver produces digital data for identifying a tone wave included in a multifrequency analog signal or produces an identification result in accordance with the condition or signal issued by the central processor. The multifrequency receiver is thereby operative to deal with tone waves which are flexible in type and input analog signals which are flexible in their frequency band, and has increased latitude of choice for the operational characteristics and function such as the number of sampling periods of input analog signals and the discrimination accuracy.

11 Claims, 6 Drawing Sheets

DATA PROCESSOR

This is a continuation of copending application Ser. No. 07/704,699 filed May 17, 1991, now U.S. Pat. No. 5,144,626, which in turn is a file-wrapper continuation of application Ser. No. 07/311,077 filed Feb. 14, 1989, now abandoned.

BACKGROUND OF THE INVENTION

The present invention relates to a data processor provided with a CPU and formed on a single semiconductor substrate, and to the technique of identifying a tone wave in an analog signal including multiple frequencies dealt with by such a data processor, and particularly to the technique applied effectively to a single-chip microcomputer LSI having DTMF (dual tone multifrequency) receiver function.

The DTMF signal used by the push-button telephone is a 2-frequency signal having, in combination, one frequency out of four low-band frequencies and one frequency out of four high-band frequencies. The DTMF signal has been used for specifying a destination station at calling, and is now used more extensively for inputting a password for reviewing automatic telephone messages and for signals of telephone-based home automation facilities and remote control facilities.

Conventionally, receivers for receiving a DTMF signal and separating its tone wave have been solely available in tie form of special LSI devices. For example, a DTMF receiver LSI device separates a tone wave from the DTMF signal using a high-band band-pass filter and low-band band-pass filter and shapes the waveform of the separated tone wave using a comparator or limiter. The device measures the interval or period of the shaped signal on the basis of a clock signal and compares the result with preset expected values to identify the tone included in the 2-frequency signal, or otherwise identifies the tone included in the 2-frequency signal through the provision of eight-channel switched capacitor filters for the discrimination among four high-band frequencies and four low-band frequencies. The result this identification is decoded by a decoder or the like, and fed out of the DTMF receiver, and delivered to a data processing LSI such as a processor or microcomputer by which an intended control is carried out. Such an LSI DTMF receiver is described, for example, in "LSI Handbook," p. 629, published by Ohm on Nov. 30, 1984.

However, if the DTMF receiver is formed of an LSI device different from the associated data processor which performs control on the basis of the receiver output, it can be susceptible to noises resultant from the interface therebetween. Furthermore, the conventional DTMF receiver LSI is designed to output externally the identification result of tone wave included in the multifrequency signal, and therefore it merely identifies limited tones, or in other words it is merely applicable to input analog signals having limited frequency bands. The DTMF receiver has its characteristics and function determined by its inherent hardware arrangement and therefore it lacks in flexibility in the tone frequency to be discriminated and in the frequency band of the input analog signal. Moreover, it has a fixed sampling rate for conversion and a fixed conversion accuracy, and therefore does not allow the selection of an operating mode and function, which is required for adapting the device to various systems and specifications in demand. These are the prior art deficiencies revealed by the inventors of the present invention.

SUMMARY OF THE INVENTION

It is an object of the present invention to provide a data processor which functions to identify a tone wave in an analog signal including multiple frequencies and allows the flexibility in the frequency band of the input analog signal.

Another object of the present invention is to provide a data processor which allows easy selection of operational characteristics and function such as the number of sampling periods and discrimination accuracy for the input analog signal in identifying a tone wave.

These and other objects and innovative features of the present invention will become more apparent from the following detailed description of embodiments and accompanying drawings.

A representative aspect of the invention disclosed hereinafter will be briefed in the following. The invention resides in a data processor comprising a multifrequency receiver formed, together with a central processor, on a single semiconductor substrate, the receiver including means of separating a tone wave from an analog signal including multiple frequencies, means for shaping the separated tone wave, means for forming digital data for frequency discrimination in accordance with the operation determined by the command or signal issued by the central processor, and means for holding the formed digital data so that it is accessible by the central processor. With the digital data forming means being constructed, for example, as a counter that counts a clock signal, which is in certain relation with the clock signal for the operation of the central processor, at an interval which is a multiple of the period of the shaped signal, the central processor fetches the count result and identifies the frequency or type of the tone wave.

In determining the operation of the digital data forming means, the central processor identifies the type of the tone wave, which constitutes the multifrequency analog signal, on a self-issued condition or signal and data provided by the digital data forming means, and consequently it becomes possible to allow flexibility in the type of tone waves to be discriminated and for the frequency band of the input analog signal.

By altering the condition or signal issued by the central processor for the determination of operation of the digital data forming means, the operational characteristics such as the sampling period and discrimination accuracy in identifying the tone wave in the input analog signal have an increased latitude of choice. With the operation of the digital data forming means being dictated cyclically in each period, or a multiple thereof, of the signal provided by the waveform shaping means, and with the central processor being directed to fetch data from the digital data forming means at a timing in synchronism with the operational command, the multifrequency receiver is operative on the asynchronous basis with the central processor, resulting in a reduction of duty of the central processor in fetching data for the discrimination of the tone waves.

DESCRIPTION OF THE PREFERRED EMBODIMENTS

Figure 1:
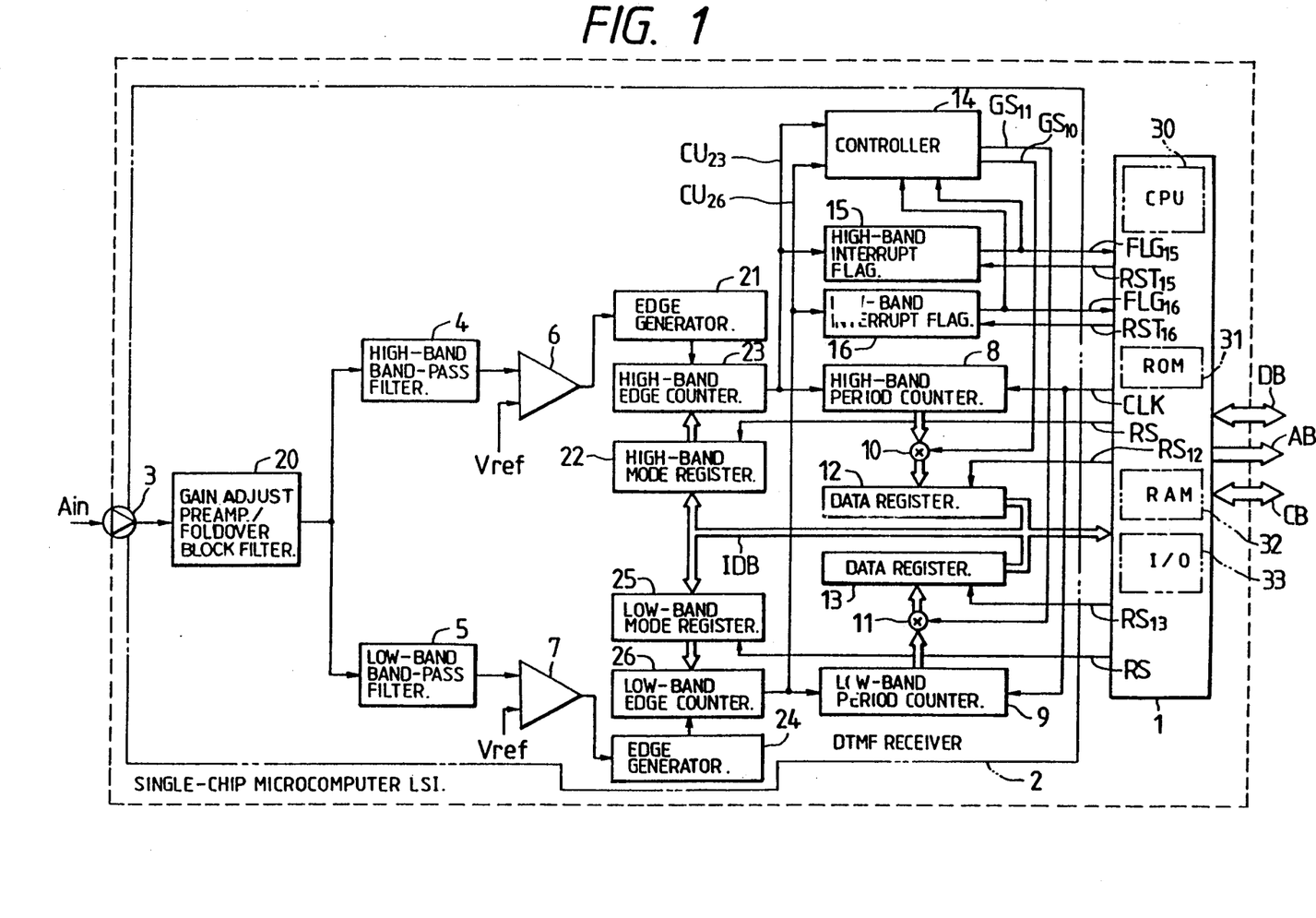
FIG. 1 is a block diagram showing, as an embodiment, the data processor according to the present invention.

FIG. 1 shows the data processor according to one embodiment of this invention. The data processor shown in the FIGURE is formed together with a central processor and associated peripheral circuit on a semiconductor substrate to complete a single-chip microcomputer LSI, although no confinement as such is intended.

In FIG. 1, a functional block 1 includes a CPU (central processing unit) 30, and ROM (read only memory) 31, RAM (random access memory) 32, and a peripheral circuit such as I/O (input/output) circuit 33 under control of the CPU 30. The functional block 1 has the interface with the outside through a data bus DB, address bus AB and control bus CB.

Indicated in FIG. 1 by numeral 2 is a DTMF receiver which functions as a peripheral unit of the single-chip microcomputer LSI. The DTMF receiver 2 is a circuit which receives the DTMF signal, i.e., a 2-frequency analog signal Ain consisting of a combination of one tone wave out of four low-band tone waves and one tone wave out of four high-band tone waves used in the push-button telephone and the like, and operates to provide information for identifying the two tone waves, although no confinement is Intended. Discrimination of the type of tone waves is implemented by the CPU 30 on the basis of the information provided by the DTMF receiver 2.

The DTMF receiver 2 is provided in its input stage with a gain adjusting preamplifier and foldover preventing filter 20 for compensating the line loss and reducing the foldover noise in the DTMF signal Ain received on the analog input terminal 3. After passing through the preamplifier-filter 20, the DTMF signal Ain is fed to a high-band band-pass filter 4 and low-band band-pass filter 5. The high-band band-pass filter 4 is to eliminate the four low-band tone waves in the input DTMF signal Ain and the low-band band-pass filter 5 is to eliminate the four high-band tone waves in the input DTMF signal Ain. These high-band band-pass filter 4 and low-band band-pass filter 5 can be switched capacitor filters of bi-quad serial configuration type or analog filters, although no confinement is intended.

A tone wave separated by the high-band band-pass filter 4 is shaped into a rectangular wave by cross-point detection rendered by a comparator such as a limiter 6 while a tone wave separated by the low-band band-pass filter 5 is shaped into a rectangular wave by cross-point detection rendered by a comparator 7. The comparators 6 and 7 are supplied with a reference voltage Vref.

For identifying the type of the signal which has been shaped by the comparator 6, the time interval of contiguous zero-cross points or a multiple thereof is measured through the provision of an edge generation circuit 21 which generates a pulse signal in each period of the output signal waveform provided by the comparator 6, a high-band edge counter 23 which counts pulses produced by the edge generation circuit 21 and provides a count-up signal CU23 at each arrival of the count at the preset value in a high-band mode register 22, and a high-band period counter 8 which clears the count at each generation of the count-up signal CU23 and counts the clock signal CLK. The count-up signal CU23 provided by the high-band edge counter 23 is also delivered to a controller 14. The controller 14 enables a gate 10 using a gate control signal GS10 before the high-band period counter 8 is cleared by the count-up signal CU23, so that the then contents of the high-band period counter 8 is transferred to a data register 12. The count-up signal CU23 sets a high-band interrupt flag 15. A flag signal FLG15 of set state indicates to the CPU 30 that the count value of the high-band period counter 8 has been loaded into the data register 12, and at the same time operates on the controller 14 to disable the gate 10 even if another count-up signal CU23 is generated. The high-band interrupt flag 15 is reset by a reset signal RST15 issued by the CPU 30. After the flag 15 has been reset, the controller 14 is enabled to load a new count value of the high-band period counter 8 into the data register 12 in response to the reception of another count-up signal CU23.

Similarly, provided on the part of the comparator 7 are an edge generation circuit 24 which generates a pulse signal in each period of the output signal waveform provided by the comparator 7, a low-band edge counter 26 which counts pulses produced by the edge generation circuit 24 and provides a count-up signal CU26 at each arrival of the count at the preset value in a low-band mode register 25, and a low-band period counter 9 which clears the count at each generation of the count-up signal CU26 and counts the clock signal CLK. The count-up signal CU26 provided by the high-band edge counter 26 is also delivered to a controller 14. The controller 14 enables a gate 11 using a gate control signal GS11 before the low-band period counter 9 is cleared by the count-up signal CU26, so that the then contents of the low-band period counter 9 is transferred to a data register 13. The count-up signal CU26 sets a low-band interrupt flag 16. A flag signal FLG16 of set state indicates to the CPU 30 that the count value of the low-band period counter 9 has been loaded into the data register 13, and at the same time operates on the controller 14 to disable the gate 11 even if another count-up signal CU26 is generated. The low-band interrupt flag 16 is reset by a reset signal RST16 issued by the CPU 30. After the flag 16 has been reset, the controller 14 is enabled to load a new count value of the low-band period counter 9 into the data register 13 in response to the reception of another count-up signal CU26.

The numbers of periods to be set in the high-band mode register 22 and low-band mode register 25, i.e., the numbers of pulse counts at which the edge counters 23 and 26 are to produce the count-up signals CU23 and CU26 are set by a CPU 30. In the setting operation, the high-band mode register 22 or low-band mode register 25 is selected by using a register selection signals RS22 and RS25 produced by an address decoder (not shown) which decodes the address signal of the CPU 30. Similarly, the CPU 30 makes access to the count values loaded into the data registers 12 and 13, which are selected using register selection signals RS12 and RS13 produced by an address decoder (not shown). The registers 12, 13, 22 and 25 are connected to the data input- /output terminals of the CPU 30 through the data bus DB.

The events of loading the count values of the period counters 8 and 9 into the data registers 12 and 13 are indicated to the CPU 30 by respective flag signals FLG15 and FLG16 of set state. The flag signals FLG15 and FLG16 are used as internal interrupt signals of the CPU 30, and upon detecting the flag signal FLG15 or FLG16 in set state at a certain timing of sampling, the CPU 30 branches to the process of DTMF receiver for identifying a tone wave in the 2-frequency DTMF signal under the prescribed condition.

Upon branching to the process of DTMF receiver, the CPU 30 first implements high-band tone discrimination, and next low-band tone discrimination, although no confinement is intended. In discriminating high-band tone waves, the CPU 30 makes access to the data register 12 to fetch the count data. The count data is compared with reference data for each of the four high-band tone waves thereby to identify the high-band tone wave included in the DTMF signal Ain. The reference data representing the four high-band and four low-band tone waves are the count values of clock signal CLK corresponding to the periods of these tone waves, or in other words these data are time information carrying the periods of the respective tone waves. Accordingly, by comparing the count values of the period counters 8 and 9 which count the clock signal CLK, directly or by applying certain weights to the values, with the reference data, the type of the tone wave included in the DTMF signal Ain is identified.

Next, the operation of the DTMF receiver will be explained in detail as an example.

For choosing the high-band discrimination or low-band discrimination in the DTMF receiver process, the CPU 30 has a high-band discrimination flag which is initialized to a set state. In the DTMF receiver process, each of the high-band and low-band tone discrimination processes take place four times, and the numbers of periods of the DTMF signal Ain measured in the four cycles of process, i.e., the numbers of pulses to be counted by the edge counters 23 and 26 are 3, 3, 2, 3, although no confinement is intended. Accordingly, the high-band mode register 22 and low-band mode register 25 are initially set by the CPU 30 to have data for three periods.

Figure 2:
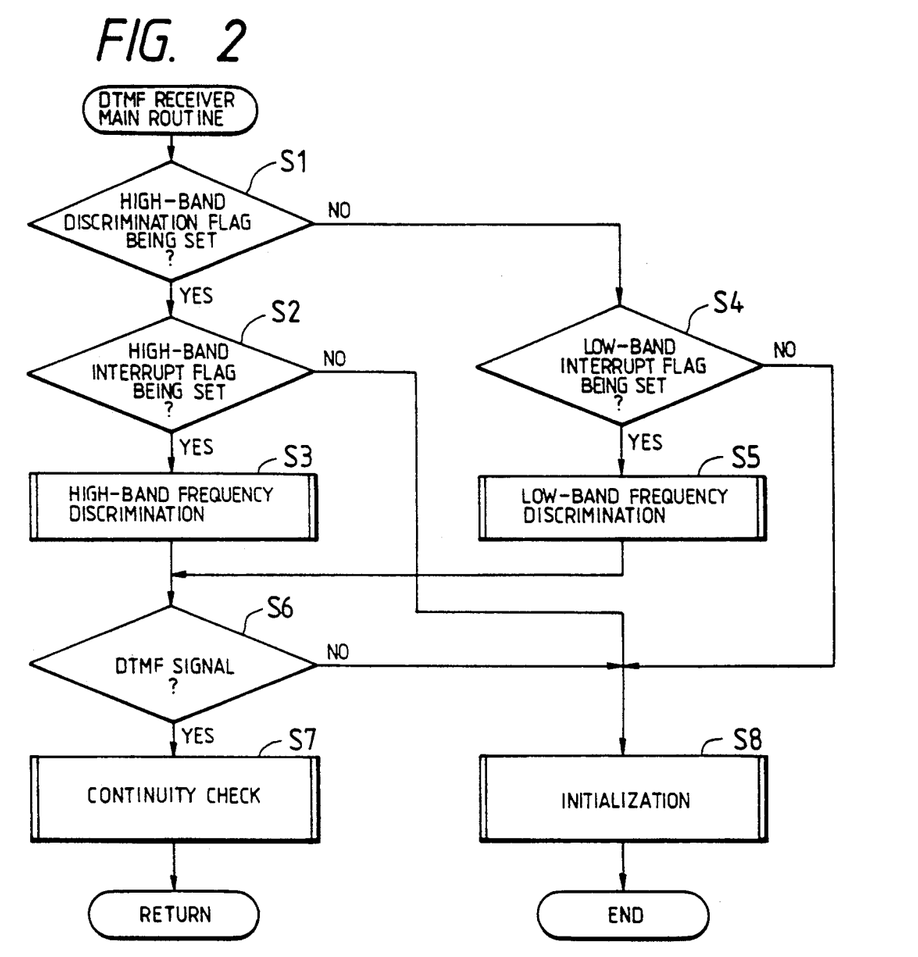
FIG. 2 is a flowchart showing, as an embodiment, the main routine of tone wave discrimination.

The main routine of the DTMF receiver process, as shown in FIG. 2, tests initially whether the high-band discrimination flag is set or not: (step S1), and, in case of set state, upon detection of a set state of the flag signal FLG15 of the high-band interrupt flag 15 in step S2, the high-band frequency discrimination routine is executed: (step S3). In case the step S1 detects the reset state, upon such detecting, by step S4, the set state of the flag signal FLG16 of the low-band interrupt flag 16, the low-band frequency discrimination routine is executed: (step S5). If, as the result of discrimination by the high-band and low-band frequency process routines, the DTMF signal is identified in step S6, the sequence is returned by way of the continuity check routine (step S7) to the beginning. If, on the other hand, the step S6 negates the DTMF signal the DTMF receiver process is terminated, with an enable bit, etc. for the DTMF receiver process being disabled: (step S8).

Figure 3:
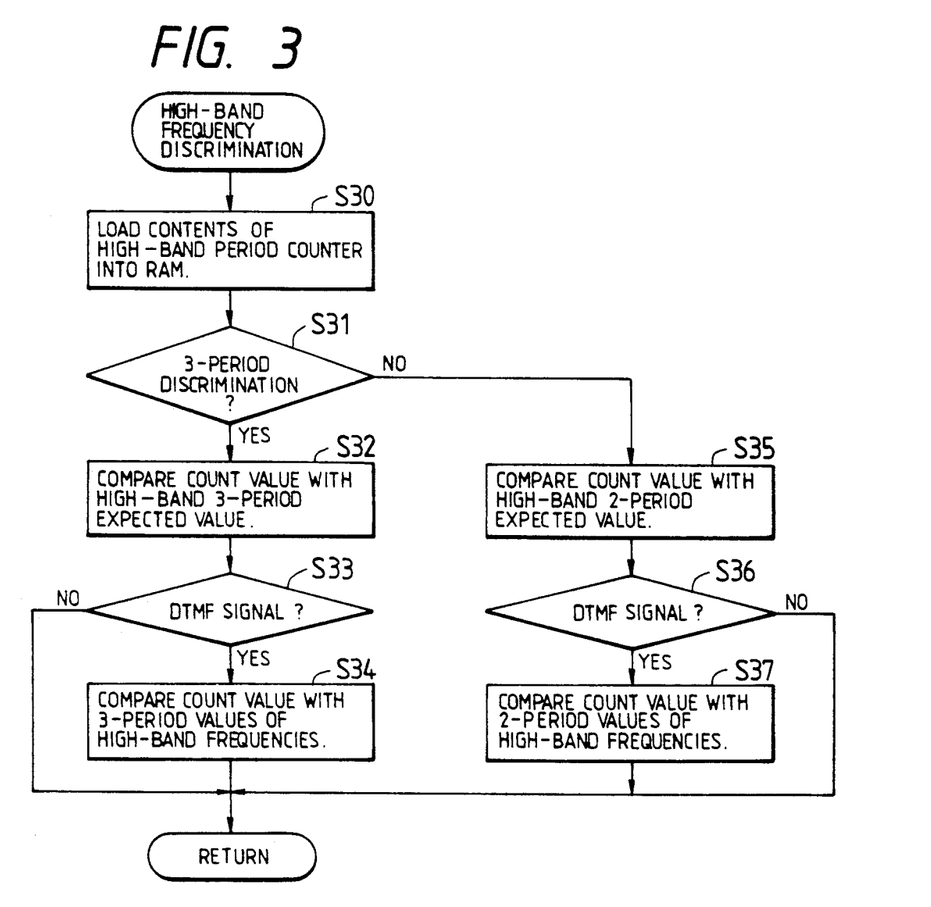
FIG. 3 is a flowchart showing the subroutine of high-band frequency discrimination in FIG. 2.

The high-band frequency discrimination routine transfers the count value of the high-band period counter 8 from the data register 12 to the RAM: (step S30), as shown in FIG. 3, and subsequently judges whether the immediate discrimination process is a 3-period discrimination, or in other words whether the count data used for discrimination is data of three periods of the DTMF signal Ain: (step S31). In case of a 3-period discrimination, a test is conducted as to whether the count value stored in the RAM is included in the four high-band tone waves of DTMF signal, i.e., whether it is a DTMF signal: (step S32), and if step S33 detects it to be a DTMF signal, discrimination among the four high-band tone waves is conducted: (step S34). If the step S31 detects 2-period discrimination, the type of high-band tone wave included in the DTMF signal is discriminated by following the steps S35–S37, in the same way as the preceding case, using reference data for 2-period discrimination.

Figure 4:
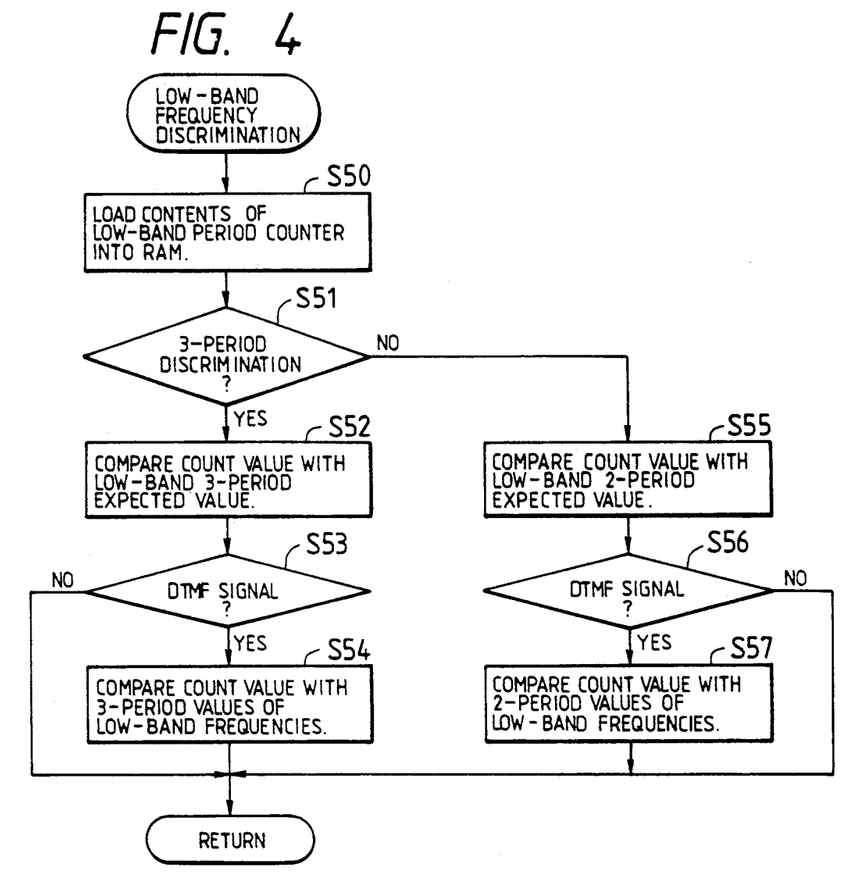
FIG. 4 is a flowchart showing the subroutine of low-band frequency discrimination in FIG. 2.

The low-band frequency discrimination routine follows steps S50–S57 shown in FIG. 4, and it is carried out in the same way as the foregoing high-band frequency discrimination process.

Figure 5:
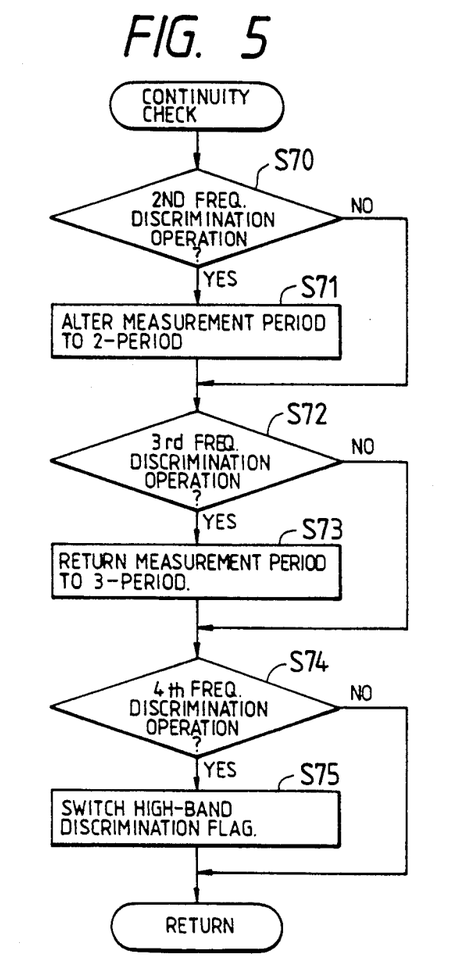
FIG. 5 is a flowchart showing the subroutine of continuity check in FIG. 2.

The continuity check routine is to alter the contents of mode registers 22 and 25 for varying the number of periods of the DTMF signal Ain from 3 to 3 to 2 to 3 for the 4-cycle measurement in high-band and low-band. As shown in FIG. 5, in the 4-cycle frequency discrimination process for high-band and low-band, if step S70 detects the frequency discrimination operation to be the second one, the content of relevant mode register 22 or 25 is replaced with the 2-period data for the third discrimination operation: (step S71). Subsequent, if step S72 detects the frequency discrimination operation to be the third one, the content of relevant mode register 22 or 25 is replaced with the 3-period data for the fourth discrimination operation: (step S73). Upon detection of the frequency discrimination operation to be the fourth one in step S74, the high-band discrimination flag is switched: (step S75). Namely, the high-band discrimination flag in set state is reset, or the flag in reset state is set. Consequently, following the 4-cycle high-band (low-band) frequency discrimination process, the next 4-cycle low-band (high-band) frequency discrimination process is ready to commence.

According to this embodiment, as explained above, the CPU 30 discriminates the type of tone wave included in the DTMF signal on the basis of the clock signal CLK issued by itself for the determination of the count operation of the high-band period counter 8 and low-band period counter 9, the set up values of the mode registers 22 and 25 and the count values of the counters 8 and 9, and therefore the characteristics and function of the DTMF receiver 2 are not determined by its inherent hardware arrangement, but instead it is possible to have flexibility in the type of tone waves to be discriminated and the frequency band of the DTMF signal Ain. Furthermore, in order for the applied input analog signal to have increased flexibility in its frequency band, the switching clock signal for the switched capacitor filters constituting the band-pass filters 4 and 5 has its frequency made variable or selectable, preferably.

By varying the setup values of the mode registers 22 and 25 or the frequency of the clock signal CLK, the functional selection related to the operational characteristics such as the number of periods of measurement for the DTMF signal Ain and the count accuracy of zero-cross interval of the shaped signal can have an increased latitude. The count data which are once held in the data registers 12 and 13 are not replaced with new count values so far as the CPU 30 resets the flags 15 and 16, and therefore the same count data can be sampled any number of times for use in the tone wave discrimination process, resulting in an increased latitude of functional selection also in this respect.

Increased latitude of selection for the operational characteristics and function of the DTMF receiver 2 allows the determination of the sampling rate and the number of times of sampling in consideration of the processing ability and duty of the CPU 30, and consequently the DTMF receiver 2 can have a maximum reliability within the allowable range in the system.

Once the count values of the period counters 8 and 9 have been loaded into the data registers 12 and 13, this event is indicated to the CPU 30 as the flag signals FLG15 and FLG16, and therefore the CPU 30 can proceed to the process of tone wave discrimination by fetching the count data at arbitrary timing, allowing the DTMF receiver 2 to operate asynchronously with the CPU 30, whereby the duty of the CPU 30 can be reduced in having the count data for tone wave discrimination.

Figure 6:
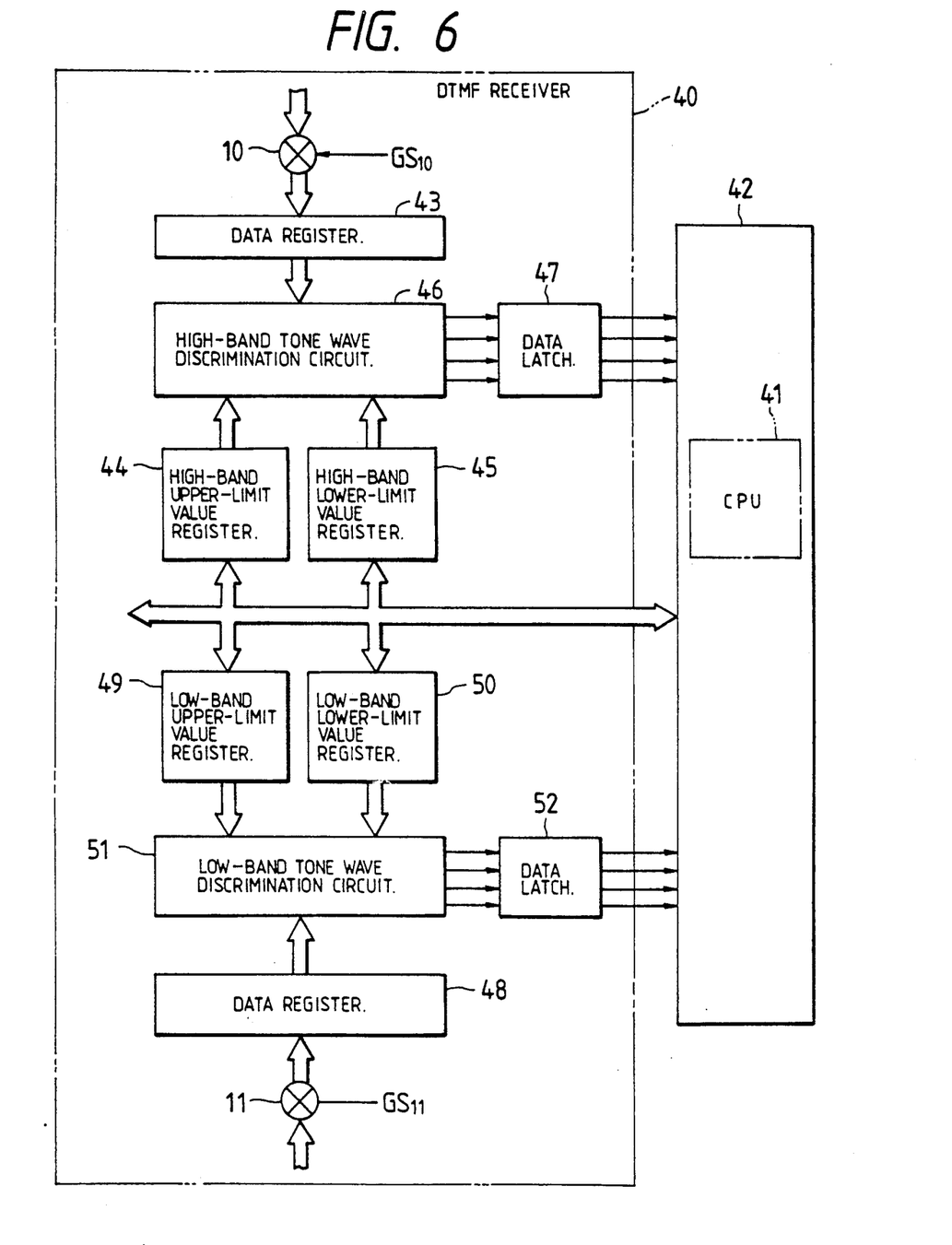
FIG. 6 is a block diagram showing another embodiment of the digital processor according to the present invention.

FIG. 6 shows in part another embodiment of this invention. In contrast to the preceding embodiment of FIG. 1 in which the CPU 30 identifies the type of tone wave included in the DTMF signal Ain by reading the contents of data registers 12 and 13, the embodiment shown in FIG. 6 features that the DTMF receiver 40 implements the identification operation.

The DTMF receiver 40 of FIG. 6 constitutes a single-chip microcomputer LSI which also includes a function block 42 including a CPU 41. The DTMF receiver 40 has its data registers 12 and 13 modified, from those shown in FIG. 1, as shown in FIG. 6. Included on the part of the above-mentioned high-band period counter 8 are a data register 43 for holding the count value of the counter 8, a high-band upper-limit value register 44 and high-band lower-limit value register 45 in which reference data for the discrimination of high-band tone waves are set in correspondence to the four high-band tone waves, a high-band tone wave discrimination circuit 46 which compares the count value held in the data register 43 with the reference data to identify the type of high-band tone wave included in the DTMF signal Ain, and a data latch 47 which holds the identification result provided by the high-band tone wave discrimination circuit 46 so that it is accessible by the CPU 41. The high-band tone wave discrimination circuit 46 identifies the type of tone wave by testing as to which reference data out of ones corresponding to the four high-band tone waves has its upper and lower limit values that cover the measured count value. Included on the part of the low-band period counter 9 are a data register 48 for holding the count value of the counter 9, a low-band upper-limit value register 49 and low-band lower-limit value register 50 in which reference data for the discrimination of low-band tone waves are set in correspondence to the four low-band tone waves, a low-band tone wave discrimination circuit 51 which compares the count value held in the data register 48 with the reference data to identify the type of low-band tone wave included in the DTMF signal Ain, and a data latch 52 which holds the identification result provided by the low-band tone wave discrimination circuit 51 so that it is accessible by the CPU 41. The low-band tone wave discrimination circuit 51 identifies the type of tone wave by testing as to which reference data out of ones corresponding to the four low-band tone waves has its upper and lower limit values that cover the measured count value.

This embodiment allows the CPU 41 merely to take in, at arbitrary timing, information representing the type of tone wave identified by the DTMF receiver 40 in accordance with the self-issued operational condition, instead of having to identify the type of tone wave by itself, whereby the duty of the CPU can be reduced significantly.

Although specific embodiments of the present invention have been described, the invention is not confined to these embodiments, but various modifications are possible without departing from the substance of the invention.

For example, although the above embodiments have separate hardware sections for high-band tone waves and low-band tone waves, part of the hardware arrangement may be used commonly for both bands on the time slice basis in consideration of the processing ability of the central processor for the discrimination of tone waves. Alternatively, the arrangement may be formed in hardware sections for high band, medium band and low band.

Although in the above embodiments, the readenable state of the count value provided by the period counter is indicated to the central processor by means of a high-band and low-band interrupt flags 15 and 16, these flags may be replaced with an interrupt flag common to both bands and a flag bit which identifies the sourcing band of the interrupt flag. In this case, the flag bit is controlled using the rectangular waves produced by the comparators 6 and 7, and the flag bit is sampled when the interrupt caused by the interrupt flag is accepted.

Although in the above embodiments, the DTMF receiver 2 uses period counters, the present invention is not confined to this case, but it may employ the configuration of switched capacitor filter. In this case, the switched capacitor filter has its capacitor ratio switched on a time slice basis so that band-pass filters for multiple channels are formed to deal with four high-band tone waves and four low-band tone waves, and channel discrimination is implemented by clock operation so that the channel signal with the maximum amplitude is detected in the serial output corresponding to each channel and corresponding data is loaded into the data register. In this case, the switched capacitor filters are designed to have the operational clock in certain relation with the operational reference signal of the microprocessor.

Furthermore, means of holding the count values of period counters so that they are accessible by the central processor may be formed in the first-in-first-out (FIFO) configuration. In this case, the count value of the period counter immediately before it is cleared can be loaded a multiple number of times successively into the data holding means.

The central processor is capable of recognizing the frequency of the count clock signal relative to its own operational reference clock signal, and therefore the tone wave discrimination process is not confined to the comparison process with reference data, but discrimination may be made from the computational result based on the frequency of the count clock signal and count data.

Moreover, instead of using the edge counter and mode counter in the embodiment of FIG. 1, the output of the edge generation circuit or the output of the comparator may be supplied directly to the period counter.

Although the invention has been described for the case of application to a single-chip microcomputer LSI incorporating a DTMF receiver, which is the utilization field forming the background of this invention, the invention is not confined to this application, but it is applicable extensibly to microcomputer LSI devices incorporating a multifrequency receiver dealing with multifrequency analog signals other than the DTMF signal and to other data processing LSI devices.

What is claimed is:

1. A method of discriminating kinds of first and second frequency signals included in an input analog signal, the first frequency signal being one of low-band frequency signals, and the second frequency signal being one of high-band frequency signals, the method comprising the steps of:
   a) receiving the analog signal;
   b) separating the first and second frequency signals in the analog signal;
   c) shaping waveforms of the separated first and second frequency signals;
   d) forming pulse signals in each period of respective shaped waveforms of the separated first and second frequency signals;
   e) counting the number of pulse signals and generating count-up signals each time the counted number of pulse signals equal values set in mode registers, wherein the values in the mode registers are more than 2;
   f) counting the number of clock signals for a period of the count-up signals;
   g) storing values obtained by the step of counting the number of the clock signals in data registers;
   h) reading the values in the data registers by a central processing unit; and
   i) comparing the values read out from the data registers with reference data to discriminate between types of the first and second frequency signals in the input analog signal.

2. A method according to claim 1, further comprising the step of repeating the steps d) to i).

3. A method according to claim 2, further comprising the step of:
   changing the values in the mode registers prior to the repeating step.

4. A method according to claim 3, further comprising the step of:
   changing the value in the register means prior to the repeating step.

5. A method according to claim 2 wherein the values in the mode registers are adjusted automatically.

6. A method of processing first and second tone waves in a dual tone multi-frequency signal, a frequency of the first tone wave having a frequency of one of low-band tone waves, a frequency of the second tone wave having a frequency of one of high-band tone waves, the method comprising the steps of:
   a) receiving the dual tone multi-frequency signal;
   b) separating the first and second frequency tone waves in the dual tone multi-frequency signal;
   c) shaping waveforms of the separated first and second tone waves;
   d) forming pulse signals in each period of respective shaped waveforms of the separated first and second tone waves;
   e) counting the number of pulse signals and generating count-up signals each time the counted number of pulse signals equal values set in register means, wherein the values in the register means are equal to or more than 2;
   f) counting the number of clock signals for a period of the count-up signals;
   g) storing values obtained by the step f) in respective data registers;
   h) reading the values in the respective data registers by a central processing unit;
   i) comparing the values read-out from the respective data registers with reference data in memory means to discriminate between types of the first and second tone waves in the dual tone multi-frequency signal; and
   j) repeating the steps d) to i) to check continuity of the dual tone multi-frequency signal.

7. A method according to claim 6 wherein the values in the mode registers are adjusted automatically.

8. A method of processing a high-band tone wave in a dual tone multi-frequency signal, the dual tone multi-frequency signal including a low-band tone wave which have a frequency corresponding to a frequency of one of low-band tone wave signals and the high-band tone wave which have a frequency corresponding to a frequency of one of high-band tone wave signals, the method comprising the steps of:
   a) receiving the dual tone multi-frequency signal;
   b) separating the low-band and high-band tone waves in the dual tone multi-frequency signal;
   c) shaping waveforms of the high-band tone wave;
   d) forming pulse signals in each period of respective shaped waveforms of the separated high-band tone wave;
   e) counting the number of pulse signals and generating count-up signals each time the counted number of pulses equal a value set in register means, wherein the value in the register means is equal to or more than 2;
   f) counting the number of clock signals for a period of the count-up signals;
   g) storing a value obtained by the step f) in a data register;
   h) reading the value in the data register by a central processing unit; and
   i) comparing the value read-out from the data register with reference data in memory means to discriminate a type of the high-band tone wave in the dual tone multi-frequency signal.

9. A method according to claim 8, further comprising the step of:
   repeating the steps d) to i) to check continuity of the high-band tone wave in the dual tone multi-frequency signal.

10. A method according to claim 9, further comprising the step of:
    changing the value in the register means prior to the repeating step.

11. A method according to claim 8 wherein the values in the mode registers are adjusted automatically.

* * * * *